United States Patent Office 3,133,099
Patented May 12, 1964

3,133,099
STABLE LEAD ALKYL COMPOSITIONS AND A METHOD FOR PREPARING THE SAME
Shirl E. Cook and Wilford H. Thomas, Baton Rouge, La., assignors to Ethyl Corporation, New York, N.Y., a corporation of Virginia
No Drawing. Filed June 8, 1962, Ser. No. 200,937
11 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkylead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition becomes selfpropagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz., separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of a mixture of materials which has the property of synergistically inhibiting alkyllead thermal decomposition. The foregoing objects are also accomplished by conducting one or more of the foregoing operations in the presence of such a mixture of materials. The mixtures which have been found to possess these unexpected properties are referred to hereinafter as "thermal stabilizers."

The synergistic thermal stabilizer mixtures of this invention are composed of at least two different chemical types of hydrocarbons which are used in conjunction with each other. Therefore in its simplest form this invention involves the use of two hydrocarbon ingredients in conjunction with the alkyllead compounds to be stabilized.

The first ingredient is a mononuclear aromatic hydrocarbon having the formula

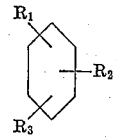

wherein $R_1$, $R_2$ and $R_3$ are hydrogen or acyclic hydrocarbon side chains containing up to about two carbon atoms each, at least one of $R_1$, $R_2$ and $R_3$ being such a side chain. Hence, this ingredient consists of three chemical types of materials—viz., lower alkyl benzenes, vinyl benzenes (e.g., styrene, divinyl benzene, p-methyl styrene, etc.), and phenyl acetylenic compounds (i.e., ethynyl benzenes). It will be understood, of course, that the individual hydrocarbon side chains of this ingredient may differ from each other as for example in the compounds 1-ethyl-4-vinyl benzene, 1-methyl-4-ethynyl benzene, etc.

The first ingredient is utilized in proportions of from about 5 to about 25 weight percent based on the weight of the alkyllead compound being stabilized. Departures from these proportions are permissible where the conditions of service and utility warrant or justify such departures.

The second hydrocarbon ingredient utilized pursuant to this invention is representative of at least one of the following types of compounds:

(a) Phenyl acetylenic hydrocarbons containing from 8 to about 10 carbon atoms;
(b) Biphenyl hydrocarbons containing from 12 to about 14 carbon atoms;
(c) Cycloalkene hydrocarbons containing from about 6 to about 10 carbon atoms, the ring preferably containing 5 to 8 carbon atoms; and
(d) Acyclic olefinic hydrocarbons containing from about 6 to about 12 carbon atoms (these are preferably alpha-olefins but may be internal olefins as well).

This second ingredient is likewise utilized in proportions such that there is about 5 to about 25 weight percent thereof based on the weight of the alkyllead compound being stabilized. However, departures from such proportions are permissible where desirable or appropriate.

In selecting the above pair of ingredients for use in the practice of this invention, two rules should be observed. First, ingredient (1)—i.e., the compound of the formula given above—must be in a different chemical class from ingredient (2)—i.e., type (a)–(d) above. For example, where ingredient (2) is a phenyl acetylenic hydrocarbon (type (a) above), ingredient (1) is either an alkyl benzene or a vinyl benzene.

The second rule is that at least one of the selected ingredients has unsaturation which is either olefinic unsaturation or acetylenic unsaturation as distinguished from aromatic unsaturation. For example, when ingredient (1) is an alkyl benzene, ingredient (2) is either a phenyl acetylenic hydrocarbon (type (a)), a cycloalkene hydrocarbon (type (c)), or an acylic olefinic hydrocarbon (type (d)). On the other hand, when ingredient (1) is a vinyl benzene, ingredient (2) may be any of types (a)–(d), inclusive. By the same token, when ingredient (1) is an ethynyl benzene, ingredient (2) may be any of types (b)–(d), inclusive.

Exemplary of the compounds making up the first ingredient are toluene, the xylenes, the trimethyl benzenes, ethyl benzene, the diethyl benzenes, the triethyl benzenes, the methylethyl benzenes, the dimethylethyl benzenes, and like lower alkylated benzenes; styrene, alpha-methyl styrene, 3,5-dimethyl styrene, 2,4-dimethyl styrene, 4-ethyl styrene, the divinyl benzenes, the divinyl toluenes, and like vinyl benzenes; phenyl acetylene, p-tolyl acetylene, p-ethylphenyl acetylene, 3,5-dimethylphenyl acetylene, 1,4-diethynyl benzene, and like ethylnyl benzenes; and equivalent analogous materials, or mixtures thereof.

Illustrative of the type (2) ingredients are:

Type (a)—phenyl acetylene, m-tolyl acetylene, p-ethyl phenyl acetylene, 2,4-dimethylphenyl acetylene, and equivalent materials or mixtures thereof;

Type (b)—biphenyl, p-methyl biphenyl, p,p'-dimethyl biphenyl, o-methyl biphenyl, o,o'-dimethyl biphenyl, p-ethyl biphenyl, and equivalent materials or mixtures thereof;

Type (c)—cyclopentene, 4-methyl cyclopentene-1, 3-ethyl cyclopentene-1, 3,5-dimethyl cyclopentene-1, cyclohexene, 4-methyl cyclohexene-1, 1-ethyl cyclohexene-1, 3,5-dimethyl cyclohexene-1, cycloheptene, 4-methyl cycloheptene-1, 3,5- dimethyl cycloheptene-1, cyclooctene, 5-methyl cyclooctene-1, 4,7-dimethyl cyclooctene-1, and equivalent materials or mixtures thereof; and Type (d)—hexene-1, 4-methyl pentene-1, hexene-2, hexene-3, heptene-1, 3-methyl heptene-1, heptene-2, 5-methyl heptene-3, octene-1 and related octene isomers, both straight and branched chain, the various nonenes, the various decenes, the various undecenes, the various dodecenes, and equivalent materials or mixtures thereof.

The foregoing combinations of hydrocarbons when used in the amounts set forth above are very effective in substantially retarding or preventing thermal decomposition of the alkyllead compound at temperatures ranging from about 100° C. up to about 195° C. for extended periods of time. Moreover, the behavior of this combination of additives has been found to be synergistic, i.e., the thermal stabilization effectiveness of the whole is far greater than the sum total of its parts.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

The remainder of the compositions tested in the manner described above and the results thereby obtained are shown in the following table.

TABLE

*Effect of Additives on Thermal Decomposition of Alkyllead Compounds at 195° C.*

| Ex. | Run No. | Additive Complement [1] | Thermal Stability Time to Decomposition, Minutes |
|---|---|---|---|
| I | 1 | Styrene (10)+phenyl acetylene (10) | 102 |
|   | 2 | Styrene (15) | 42 |
|   | 3 | Phenyl acetylene (15) | 65 |
| II | 1 | Styrene (15)+biphenyl (5) | 74 |
|   | 2 | Styrene (15) | 42 |
|   | 3 | Biphenyl (15) | 1 |
| III | 1 | Heptene-1 (15)+xylene (5) | 12 |
|   | 2 | Heptene-1 (15) | 3 |
|   | 3 | Xylene (15) | 7 |
| IV | 1 | 4-Methyl cyclohexene-1 (10)+styrene (5) | >300 |
|   | 2 | 4-Methyl cyclohexene-1 (15) | 210 |
|   | 3 | Styrene (15) | 42 |
| V | 1 | Phenyl acetylene (15)+styrene (5) | >300 |
|   | 2 | Phenyl acetylene (15) | 65 |
|   | 3 | Styrene (15) | 42 |
| VI | 1 | Xylene(15)+4-methylcyclohexene-1(10) | >300 |
|   | 2 | Xylene (15) | 7 |
|   | 3 | 4-Methyl cyclohexene-1 (15) | 210 |
| VII | 1 | Decene-1 (10)+phenyl acetylene (10) | 42 |
|   | 2 | Decene-1 (15) | 11 |
|   | 3 | Phenyl acetylene (10) | 18 |
| VIII | 1 | Styrene (15)+phenyl acetylene (5) | >300 |
|   | 2 | Styrene (15) | 42 |
|   | 3 | Phenyl acetylene (15) | 65 |
| IX | 1 | Phenyl acetylene (15)+styrene (15) | >300 |
|   | 2 | Phenyl acetylene (15) | 65 |
|   | 3 | Styrene (15) | 42 |

[1] Numbers in parentheses following the ingredient designate the concentration thereof in terms of weight percentage based upon the weight of the tetraethyllead.

It will be noted that the compositions of this invention exhibited a high degree of synergistic effectiveness. It will also be noted that phenyl acetylene itself is an effective thermal stabilizer for tetraethyllead when present therein at concentrations of the order of about 5 to about 30 percent by weight based on the tetraethyllead. Hence, this constitutes another embodiment of this invention.

The above-described beneficial behavior of the thermal stabilizer mixtures of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizer combinations may be added in appropriate quantity to the alkyllead reaction concentrate just before the separation step which is conducted at a temperature close to the temperature where hazardous run-away decomposition is particularly prevalent. By adding one of the above thermal stabilizer combinations to the reaction concentrate just prior to distillation, the danger arising from unexpected temperature increases is substantially eliminated.

Most preferably the above thermal stabilizer combinations are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer mixture to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyl lead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

The synergistic thermal stabilizers of this invention exhibit these effects when blended or otherwise associated with other hydrocarbons such as paraffins, cycloparaffins, and the like.

What is claimed is:

1. A concentrated alkyllead compound normally susceptible to thermal decomposition at temperatures in the range of about 100° C. to about 195° C. with which has been blended in amounts sufficient to inhibit such decomposition
   (1) from about 5 to about 25 weight percent based on the weight of the alkyllead compound of a mononuclear aromatic hydrocarbon having the formula

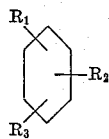

wherein $R_1$, $R_2$ and $R_3$ are selected from the group consisting of hydrogen and acyclic hydrocarbon side chains containing up to about 2 carbon atoms each, at least one of $R_1$, $R_2$ and $R_3$ being such a side chain; and
   (2) from about 5 to about 25 weight percent based on the weight of the alkyllead compound of a hydrocarbon selected from the group consisting of
      (a) phenyl acetylenic hydrocarbons containing from 8 to about 10 carbon atoms;
      (b) biphenyl hydrocarbons containing from 12 to about 14 carbon atoms;
      (c) cycloalkene hydrocarbons containing from about 6 to about 10 carbon atoms and in which the ring contains from 5 to 8 carbons atoms; and
      (d) acyclic olefinic hydrocarbons containing from 6 to about 12 carbon atoms;
ingredient (1) being in a different chemical class from ingredient (2), at least one of said ingredients (1) and (2) being selected so that it has unsaturation selected from the group consisting of olefinic unsaturation and acetylenic unsaturation.

2. The composition of claim 1 wherein said ingredient (1) is a lower alkyl benzene.

3. The composition of claim 1 wherein said ingredient (1) is a vinyl benzene.

4. A concentrated alkyllead compound normally susceptible to thermal decomposition at temperatures in the range of about 100° C. to about 195° C. with which has been blended in amounts sufficient to inhibit such decomposition
   (1) from about 5 to about 25 weight percent based on the weight of the alkyllead compound of a mononuclear aromatic hydrocarbon having the formula

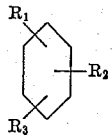

wherein $R_1$, $R_2$ and $R_3$ are selected from the group consisting of hydrogen and acyclic hydrocarbon side chains containing up to about 2 carbon atoms each, at least one of $R_1$, $R_2$ and $R_3$ being such a side chain; and
   (2) from about 5 to about 25 weight percent based on the weight of the alkyllead compound of a hydrocarbon selected from the group consisting of
      (a) phenyl acetylenic hydrocarbons containing from 8 to about 10 carbon atoms;
      (b) biphenyl hydrocarbons containing from 12 to about 14 carbon atoms;
      (c) cycloalkene hydrocarbons containing from about 6 to about 10 carbon atoms and in which the ring contains from 5 to 8 carbons atoms; and
      (d) acyclic olefinic hydrocarbons containing from 6 to about 12 carbon atoms;
ingredient (1) being in a different chemical class from ingredient (2), at least one of said ingredients (1) and (2) being an ethynylbenzene.

5. The composition of claim 4 wherein one of said ingredients is phenyl acetylene.

6. The composition of claim 1 wherein said ingredient (1) is styrene.

7. The composition of claim 1 wherein said alkyllead compound is selected from the group consisting of tetramethyllead, ethyltrimethyllead, diethyldimethyllead, triethylmethyllead, tetraethyllead, and mixtures thereof.

8. The composition of claim 1 wherein said alkyllead compound is tetraethyllead.

9. A method of inhibiting the decomposition of an alkyllead compound at temperatures of from about 100° C. to about 195° C. which comprises incorporating with said compound a combination of ingredient (1) and of ingredient (2) as defined in claim 1 so as to form a composition defined in claim 1.

10. In the process of producing an alkyllead compound by reacting a sodium lead alloy with alkyl chloride and separating the thus produced alkyllead compound from the reaction mass by steam distillation, the step which comprises conducting said steam distillation in the presence of a combination of ingredient (1) and ingredient (2) as defined in claim 1 in the proportions therein stated.

11. Tetraethyllead with which has been blended from about 5 to about 30 percent by weight based on the weight of the tetraethyllead of phenyl acetylene.

References Cited in the file of this patent

UNITED STATES PATENTS

| 2,992,250 | Shapiro | July 11, 1961 |
| 3,038,918 | Cook et al. | June 12, 1962 |
| 2,038,919 | Cook et al. | June 12, 1962 |